US006961682B2

(12) United States Patent
Doner

(10) Patent No.: US 6,961,682 B2
(45) Date of Patent: Nov. 1, 2005

(54) YARD PERFORMANCE MODEL BASED ON TASK FLOW MODELING

(75) Inventor: John R. Doner, Melbourne, FL (US)

(73) Assignee: GE Harris Railway Electronics, LLC, Melbourne, FL (US)

( * ) Notice: Subject to any disclaimer, the term of this patent is extended or adjusted under 35 U.S.C. 154(b) by 922 days.

(21) Appl. No.: 09/751,362

(22) Filed: Dec. 28, 2000

(65) Prior Publication Data

US 2002/0082814 A1 Jun. 27, 2002

Related U.S. Application Data

(60) Provisional application No. 60/173,436, filed on Dec. 29, 1999.

(51) Int. Cl.[7] ................................................ G06F 17/50

(52) U.S. Cl. ..................... 703/2; 703/6; 705/8; 701/29; 107/88.01

(58) Field of Search ..................... 703/2, 16, 6; 700/33, 700/34; 705/8, 7; 701/119, 29; 709/100; 104/88.01

(56) References Cited

U.S. PATENT DOCUMENTS 3,944,986 A * 3/1976 Staples .................... 104/88.04
4,843,575 A * 6/1989 Crane .......................... 701/99
5,157,659 A 10/1992 Schenkel
5,245,929 A 9/1993 Wertz et al.
5,255,181 A * 10/1993 Chapman et al. .............. 705/8
5,299,287 A * 3/1994 Tsuruta et al. ................ 706/46
5,345,878 A 9/1994 Jacob
5,456,604 A * 10/1995 Olmsted et al. .............. 434/62
5,608,412 A 3/1997 Welles, II et al.
5,623,413 A * 4/1997 Matheson et al. .......... 701/117
5,848,403 A * 12/1998 Gabriner et al. .............. 706/13
5,864,315 A 1/1999 Welles, II et al.
5,883,337 A 3/1999 Dolan et al.
5,896,304 A 4/1999 Tiemann et al.
5,983,144 A 11/1999 Bonissone et al.
5,995,737 A 11/1999 Bonissone et al.
6,125,311 A * 9/2000 Lo ............................. 701/29
6,154,735 A * 11/2000 Crone ......................... 706/45
6,240,439 B1 * 5/2001 Hasegawa et al. .......... 718/100
6,243,694 B1 6/2001 Bonissone et al.
6,304,801 B1 * 10/2001 Doner ......................... 701/19
6,519,595 B1 * 2/2003 Rose ........................... 707/10
6,587,738 B1 * 7/2003 Belcea ........................ 700/33
6,832,204 B1 * 12/2004 Doner ........................... 705/8

* cited by examiner

*Primary Examiner*—Thai Phan
(74) *Attorney, Agent, or Firm*—Armstrong Teasdale LLP

(57) ABSTRACT

A method for managing railcar movement in a railyard based on the flow of railyard tasks, using a system that includes a computer including a processor, a memory device, and a database. The railyard includes six subyards including a surge yard, a receiving yard, a receiving inspected (RI) yard, a classification yard, a departure yard and a departure inspected (DI) yard. The method uses initial parameters, input to the computer, to simulate railyard task flow utilizing a yard performance model. Based on the simulation, the method determines if a train schedule can be met.

37 Claims, 8 Drawing Sheets

YARD PERFORMANCE MODEL BASED ON TASK FLOW MODELING

CROSS REFERENCE TO RELATED APPLICATIONS

This application claims the benefit of U.S. Provisional Application No. 60/173,436, filed Dec. 29, 1999, which is hereby incorporated by reference in its entirety.

BACKGROUND OF THE INVENTION

This invention relates generally to railyard management, and more particularly to a yard performance model for expediting and simplifying the process of moving railcars through a railyard from arrival to departure.

A terminal area is primarily used to reorganize incoming freight into new trains, which then move the freight to further destinations. A terminal area comprises one or more switchyards and interconnecting rails, and the performance of the entire terminal area depends primarily on the activities within the terminal switchyard(s) and the efficient dispatch of traffic within the terminal area. Thus, a terminal area in effect can be visualized as a small railroad network in and of itself, with the primary activities of managing the dispatch of traffic within the terminal area, and building trains within the switchyard(s).

Railroad resources and activities are often analyzed hierarchically, from a network, regional, and local perspective. The regional perspective primarily emphasizes the intra-regional flow of traffic between terminal areas within a region, with the primary purpose of assuring that trains meet their schedules. As such, the regional perspective of the terminal area is not concerned with the details of train building in the terminal area, but with the overall ability of the terminals to meet the schedule for the flow of trains into and out of the terminal area.

Rail corridors and terminals present an alternating sequence of services to railcars. The services alternate between transportation and routing. These services and the resources required are in limited supply. The objective of the regional level of network planning is to allocate the available resources and services within a given time period to optimize the flow of a collection of trains. This requires optimizing over time the allocation of a very large collection of factors, such as, rail segments, switches, crews, locomotives, yard personnel, and yard facilities. Such an optimization is computationally infeasible. However, the regional view of yards and corridors is feasible using modeling techniques, which provide accurate, but not necessarily perfect, views of the capacities of yards and corridors and the relevant services involved in moving trains through the system.

The train building process in a switchyard requires the use of tightly coupled and limited resources, with difficult constraints to be met as to train arrival and departure schedules. To model the process in detail, including the order of all operations, requires extensive mathematical development, and is dependent on yard topology. Therefore, it would be desirable to provide a method of allocating the available resources and services within a railyard in a given time period to optimize the flow of a collection of trains.

The regional concept of the switchyard provides a simplified switchyard model posed as a sequence of car flows between reservoirs, representing the sequence of tasks performed on each car during the (TBP), with each reservoir having a limited capacity, and the flows between reservoirs being dynamically modulated over time by various factors present in every yard.

BRIEF SUMMARY OF THE INVENTION

In an exemplary embodiment, a regional terminal model focuses on the train building process (TBP) within a switchyard, and treats the TBP as a linear flow of cars from task to task within the yard. The model ignores inferences related to the specific ordering of activities in a rail yard, and assumes a first-in, first-out order of processing. Therefore, the primary performance metric derivable is a function of time that indicates how many cars can move through the yard in a specific time interval. Thus, a flow rate of trains in and out of the yard can be verified as possible or not possible, based on whether or not the yard can accommodate all of the incoming cars and process the cars at a specific time to build an outbound train scheduled to leave at that time. In this way, a regional overview corridor and yard use is utilized to assess whether or not a given yard can support a desired train schedule. More specifically, a regional overview is used to determine whether a given yard can support a flow of enough cars to build and depart the scheduled trains in a desired interval.

The regional terminal model, in effect provides an envelope for yard capability, such that, by reordering activities within the yard, a Yard Master can permute an assumed first-in, first-out order of train building, provided the total number of cars to be departed in the affected interval is not increased. More specifically, the model determines the capability of a switchyard to build trains, based on the schedules for arriving and departing trains and by identifying the tasks through which each car must pass in order to move from yard input to yard output, and modulating the flow of the cars based on yard topology and yard labor availability.

DETAILED DESCRIPTION OF THE INVENTION

Figure 1:
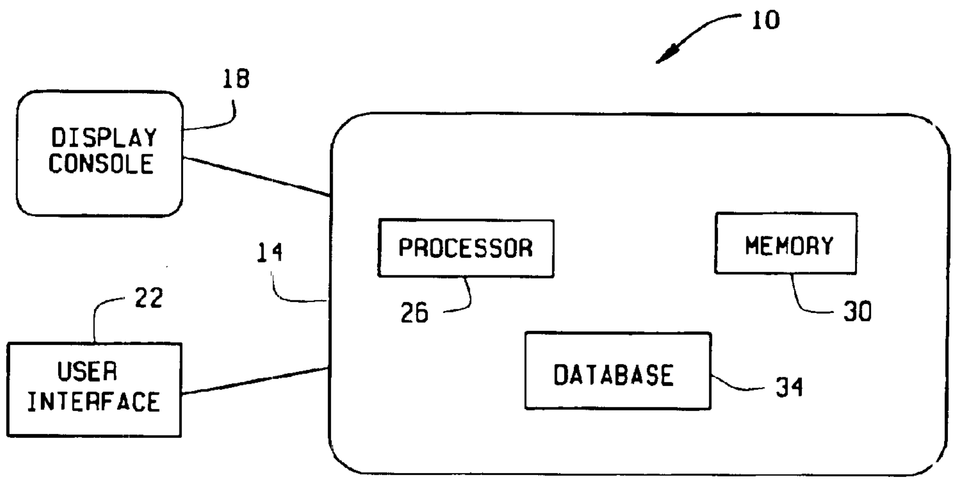
FIG. 1 is a diagram of a system used to implement the railyard performance model in accordance with one embodiment of the present invention.

FIG. 1 is a diagram of a system 10 for implementing a yard performance model in accordance with one embodiment of the present invention. System 10 includes a computer 14, a display console 18 for viewing information input to and output from computer 14, and a user interface 22 for inputting information, parameters and data to computer 14. Computer 14 includes a processor 26 for executing all functions of computer 14, a memory storage device 30 for storing data and algorithms, and a database 34 for storing specific additional data. A yard master utilizes user interface 22 to input queries, parameters and data related to yard performance. In response to the yard master's inputs, computer 14 utilizes processor 26, memory 30, and database 34 to solve equations and execute algorithms implemented in the yard performance model.

Figure 2:
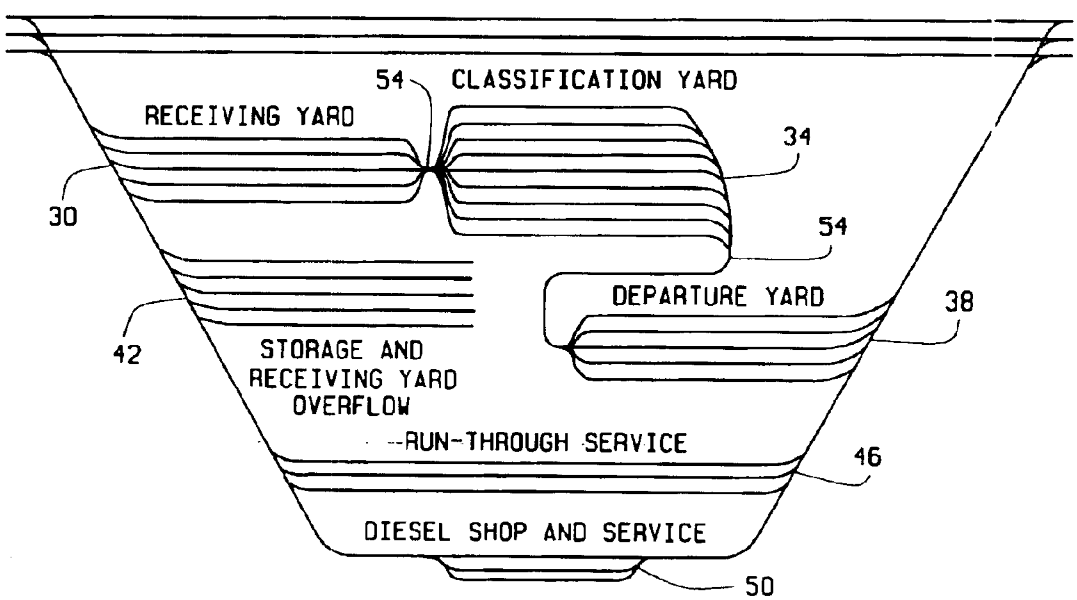
FIG. 2 is a diagram of a railyard for illustrating the train building process in which the system shown in FIG. 1 is utilized.

FIG. 2 is a diagram of a railyard layout for illustrating particular railyard activities involved in implementation of the yard performance model in which the system shown in FIG. 1 is utilized. A railyard includes various sets of tracks dedicated to specific uses and functions. For example, an incoming train arrives in a receiving yard 30 and is assigned a specific receiving track. Then at some later time, a switch engine enters the track and moves the railcars into a classification area, or bowl, 34. The tracks in classification yard 34 are likewise assigned to hold specific blocks of railcars being assembled for outbound trains. When a block of railcars is completed it is assigned to a specific track in a departure yard 38 reserved for assembling a specific outgoing train. When all the blocks of railcars for the departing train are assembled, one or more locomotives from a locomotive storage and receiving overflow yard 42 will be moved and coupled to the assembled railcars. A railyard also includes a service run through area 46 for servicing railcars, and a diesel shop and service area 50 used to service and repair locomotive. The organization of yards normally includes a number of throats, or bottlenecks 54, through which all cars involved in the train building process (TBP) must pass. Throats 54 limit the amount of parallel processing possible in a yard, and limit the rate at which the sequence of train building tasks may occur. Receiving yard 30, classification yard 34, storage yard 42, departure yard 38, run through area 46 and diesel shop area 50 are comprehensively referred to as subyards.

Receiving yard 30 has a single lead-in track, which limits the rate at which cars can enter the TBP, and likewise for cars being moved to the receiving yard from overflow area 42. The number of leads between receiving yard 30 and classification yard 34 is likewise usually limited to one or two, as are the number of leads between classification yard 34 and departure yard 38, and the number of leads from departure yard 38 to a main line (not shown). Due to bottlenecks 54, there would normally be at most one or two switch engine crews devoted to moving cars/trains between the subyards. Therefore, the levels of flow for each task of the TBP are limited to a few options. Furthermore, use of two, rather than one, switch engines occasionally results in periods of inefficiency, due to one engine being blocked by the activities of the other. Therefore, the effect of multiple engines supporting one task will not be linear.

However, not all tasks of the TBP directly involve engines, also referred to as locomotives. For example, cars arriving in receiving yard 30 must be inspected for defects, or "bad orders", which must be repaired before the car leaves yard 30. Trains being built in departure yard 38 must have all brake hoses between cars joined, and the brake line must be pressurized and tested before the train can depart. These tasks benefit linearly from additional personnel.

Each car that arrives in the railyard to pass through the TBP requires four or five distinct tasks to be performed in serial order before it is ready as part of an outbound train. Each car (1) must be pulled into receiving yard 30 from the main line or overflow area 42, (2) must be inspected in receiving yard 30, (3) must be moved from receiving yard 30 to classification yard 34, (4) must be pulled, as part of a block, from classification yard 34 to departure yard 38, (5) must have brake hoses attached to adjoining cars and have the brakes pressure-tested as part of an outbound train.

Figure 3:
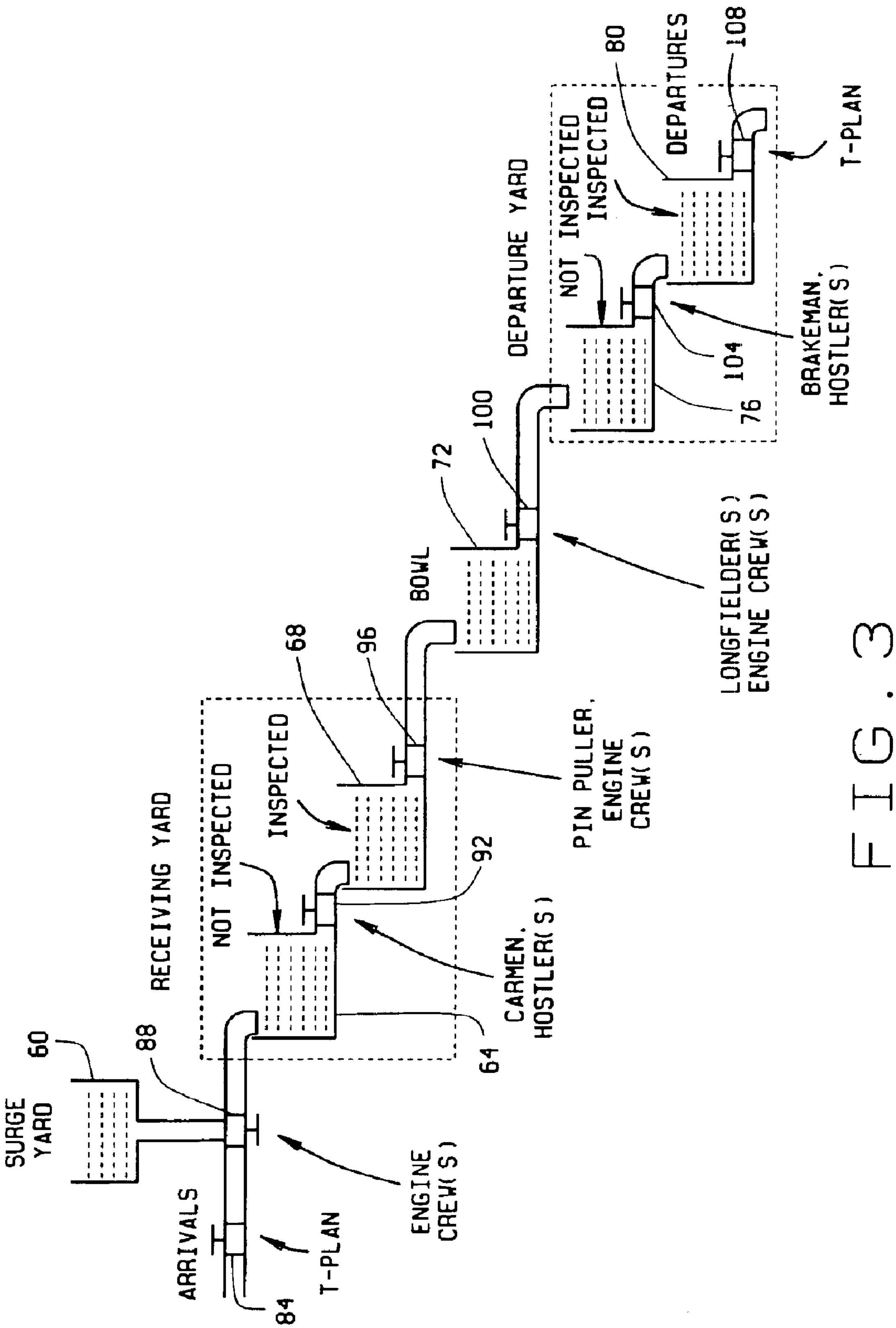
FIG. 3 illustrates the railyard shown in FIG. 2 as a series of flows between reservoirs with valves interposed between reservoirs.

FIG. 3 illustrates a railyard as a series of flows between reservoirs 60, 64, 68, 72, 76 and 80 with valves 84, 88, 92, 96, 100, 104 and 108 interposed between reservoirs. Reservoirs 60, 64, 68, 72, 76 and 80 represent subyards and the valves represent modulation of the flow between subyards. Overflow or surge yard reservoir 60 is used to accommodate incoming trains only if there is insufficient space in the receiving yard reservoir 64. Receiving yard reservoirs 64 and 68, and departure yard reservoirs 76 and 80 are each depicted, in FIG. 3, as two reservoirs, dichotomized according to whether railcars have or have not been inspected. The receiving yard is for bad orders and railcars that have or have not been inspected in the departure yard to verify that the brake hoses have been coupled and pressure-tested. Thus, receiving yard reservoir 64 represents railcars in receiving yard 30 (shown in FIG. 2) that have not been inspected, and receiving yard reservoir 68 represents railcars in receiving yard 30 that have been inspected. Likewise, departure yard reservoir 76 represents railcars in departure yard 38 (shown in FIG. 2) that have not been inspected, and departure yard reservoir 80 represents railcars in departure yard 38 that have been inspected.

Each of valves 84, 88, 92, 96, 100, 104 and 108 denote a task flow modulation associated with a modulating agent. Inbound flow valve 84 is effectively opened for inflow by the T-Plan, and surge yard reservoir 60 must be prepared to accept the increase in level. Surge-to-receiving flow valve 88 is modulated by the need to move railcars from surge yard reservoir 60, and the availability of an engine crew to effect that action. Receiving inspection (RI) flow valve 92 is modulated by the availability of a carman to perform inspections and a hostler for removing power from incoming trains. Classification or bowl flow valve 96 is modulated by engine crews and a pin puller, who are actively moving railcars from receiving yard reservoir 68 to bowl reservoir 72. Departure flow valve 100 is modulated by longfielder(s) and engine crew(s). Departure inspection (DI) flow valve 104 is modulated by brakemen and hostler(s) who couple and inspect brakes and attach power to the trains. Finally, outbound flow valve 108 is modulated by the T-Plan departure schedule for the yard.

In addition to the direct modulation of the flows by labor and the T-Plan, the regional yard model includes flow rate modulations related to (1) internal yard congestion that affects engine movements when a subyard is nearly full, (2) dynamic reassignment of labor by a yard master, in order to alleviate the more severe backlogs, and (3) shift-dependent modulation of labor rate during a shift, which is commonly seen in yards. Each of these modulating influences will be discussed below in detail.

Other primary factors, which affect the output of a railyard over a specific time window are (1) initial conditions in the yard, such as the backlogs of cars in each yard, the proportion of receiving and departure cars already inspected, (2) the total amount and distribution of labor available for a shift, (3) maximum possible flow rates for all of the tasks, for example, a receiving yard with two lead-in tracks may be able to accept more cars per hour than one with one lead-in track, and (4) the nominal rate at which each task will be carried out, given nominal crewing. Parameters for all these inputs is gathered or inferred from yard archival data.

Although activities in a switching yard are continuous, the yard performance model advances the state of the yard in discrete time increments, for example, an interval $\Delta t$ will pass during which flow rates will remain constant and subyard car levels will vary accordingly. A yardmaster may then examine the subyard levels and modulate the flow rates according to a labor policy. The interval $\Delta t$ will be kept short, for example, 15 minutes, so that yardmaster decisions occur before any large imbalances build in the railyard.

Although the mechanics of the yard performance model are simple, very substantial oscillatory behavior can develop related to the level of cars in each subyard, the flow rates between subyards, the processes by which the flow is modulated, and the amount of delay involved in recognizing an imbalance and taking corrective action. Short-term behavior of a railyard will have an unpredictable and high variance, while long term overall flow through the yard is relatively predictable with a much lower variance.

Utilizing the yard performance model, an analyst enters relevant parameters, simulates yard task flow through a specified time interval, and determines if the train schedules for the yard during the associated time window can be met.

Yard Parameters

Table 1, below, shows a list of the data parameters, and exemplary data, associated with the yard performance model.

TABLE 1

Table of Yard and Train Parameters

Scenario

| | |
|---|---|
| Yard parameter file: | North Platte W |
| Input schedule file: | InSched |
| Output schedule file: | OutSched |
| Simulation length: | 36.0 hr. |
| Initial clock time: | 8:00 |
| Analysis window: | 0:00–8:00 |
| Random seed: | 12345 |
| Labor algorithm: | dynamic, backlog first |
| Scheduling: | fixed |
| Congestive effect: | active |
| TDM: | active |

Yard Topology and Initial State

| | Surge | Receiving | Bowl | Departure |
|---|---|---|---|---|
| Capacity (cars): | 250 | 1000 | 600 | 1200 |
| Initial Levels: | | 500 | 300 | 600 |
| % Inspected: | | 80 | | 80 |

Congestion effect - Starts at 90%, slows by 20%

Train Arrival Parameters

| | |
|---|---|
| Max. pull-in speed (mph): | 15.0 |
| Mean car length (ft.): | 60.0 |
| Mean interarrival time (hr.): | 1.3 |
| Interarrival std. dev. (hr.): | 0.25 |
| Mean train length (cars): | 106.0 |
| Train length std. dev.: | 22.0 |

Labor Parameters

| | Max. cars/hr. | Actual Cars/hr per schedule |
|---|---|---|
| Arrivals to yard: | 660 | |
| Surge to receive yard: | 300 | |
| Receive yard inspection: | 300 | 60 |
| Classification: | 240 | 66 |
| Bowl to departure yard: | 600 | 79 |
| Departure inspection & power: | 1000 | 72 |

Labor

| Mix | Surge | Receive | Classify | Trim | Departure |
|---|---|---|---|---|---|
| EC | 0.0 | 0.0 | 1.0 | 1.0 | 0.0 |
| HS | 0.0 | 0.0 | 0.5 | 0.0 | 0.5 |
| CM | 0.0 | 1.0 | 0.0 | 0.0 | 0.0 |
| PP | 0.0 | 0.0 | 1.0 | 0.0 | 0.0 |
| LF | 0.0 | 0.0 | 0.0 | 1.0 | 0.0 |
| BM | 0.0 | 0.0 | 0.0 | 0.0 | 1.0 |

Shift start: 7:00, TDM offset: 6.0 hrs., TDM decrease: 20%

A yard parameter file, an input schedule file, and an output schedule file are file names associated with the railyard and train schedules under analysis, and are prestored in system 10, or defined on-screen during a session. Once defined, the yard parameter, input schedule and output schedule can be saved within system 10 for later reuse. The simulated length and initial clock time entries are based on the local yard clock time and the intended length of time for which yard task flow is to be simulated. The analysis window parameter specifies a period of time, referenced to clock time, during the simulation when incoming cars will be counted. A time interval during which those cars exit the yard is shown in output graphs of the program. The random seed parameter is used to initialize a random number generator and uses various modes of operation. The labor algorithm parameter reflects a yard master policy for dealing with congestion in the TBP tasks. The algorithm selected may be "static", indicating no labor movements during the simulation, "dynamic, headend-first", indicating that backlogs at the front of the task flow are given priority over backlogs toward the end, or "dynamic, backlog first", indicating that higher backlogs will take priority over lower backlogs. The scheduling parameter is either fixed, denoting that a specific, defined schedule is in use, or random, indicating that the analysis program can generate random schedules for arriving and/or departing trains. The congestive effect parameter relates to when a subyard is nearly full so the engines involved in the tasks for that yard may be slowed by the need to choose a less preferred route between points. The congestive effect parameter is either active or inactive during the analysis. The TDM parameter refers to a time-dependent modulation of task rates, which occurs in many yards. The TDM is the effect of a general slowdown in labor rate toward the end of a shift. This is specifiable in the program in terms of an offset from the beginning of the shift when the effect is noted, and a percentage by which the task rates slow.

The yard topology parameters are based on the capacities of the subyards, in terms of railcars. The initial levels of cars in each yard are determined before any simulation begins based on those cars in the receive and departure yard. A percent of railcars will already have been inspected (receive yard) or ready for departure (departure yard) at the time that simulation begins.

The train arrival parameters provide a maximum pull-in speed parameter, which reflects the upper speed limit at which an arriving train may enter the receiving yard. The maximum pull-in parameter affects the maximum number of cars that can enter the receiving yard in any specified interval. The mean car length parameter, is entered in feet. Along with the maximum pull-in speed, the mean car length determines how many cars can enter the yard in a specific interval. The mean interarrival time paramter and interarrival standard deviation parameter are used if random scheduling has been chosen. If random scheduling is chosen, the train arrivals and departures will be normally distributed according to the chosen values for mean and standard deviation. The mean train length parameter and train length standard deviations parameters are used to assign normally distributed train lengths, given in cars, to trains which are generated by the random scheduling process.

The labor parameters reflect the rates at which tasks can be done in the yard, and the mix of crew members nominally assigned to each of the five flow tasks. As shown in Table 1, there are maximum possible rates and actual rates. The maximum rates are functions of the physical topology of the yard, and reflect limitations not of labor, but of available tracks. The actual rates are the task flow rates for each task as a function of crews actually assigned to the task at the initiation of the simulation. Typically, the actual flow rates for the tasks will never approach the maximum limits.

The labor mix provides a matrix denoting how labor is initially assigned to the tasks. The labor mix may vary during simulation if a dynamic labor assignment algorithms has been chosen. The abbreviations of labor categories used in the matrix are as follows.

EC—yard engine crew participating in hump and trim tasks.

HS—hostler, relating to removing power from the incoming trains and delivering power to outbound trains.

CM—carman inspecting for bad orders in the receiving yard.

PP—pin puller, relating to decoupling cars for the classify process.

LF—longfielder, relating to assisting the classification process by correcting anomalies in the classification yard.

BM—brakeman working in the departure yard to couple brake hoses and pressure test a completed train.

The labor parameters are user-specified during program execution. However, there are a number of restrictions on labor assignments. For example, labor is not completely fungible, such that, the hostlers, engine crews, and the pin pullers cannot change job categories. However, the carmen, brakemen, and longfielders can be freely reassigned within those three categories.

Finally, there are three other parameters that describe the TDM process. Time-dependent modulation of task rates is represented as a decrease in labor rate at a certain time after the beginning of the shift. Thus, the time of shift initiation, relative to the clock time for initiation of the simulation, the time at which task flow rates decrease, as an offset from the beginning of the shift, and the percent by which the task flow decreases from the offset to the end of the shift, are necessary parameters.

In addition to the parameters described above, schedule parameters defining a train schedule need to be defined. Schedule parameter are typically saved to and retrieved from a disk for use in the yard performance mode. In one embodiment, the pertinent schedule parameters are the number of trains the schedule will contain, the total time interval for the schedule, whether or not inbound train arrival times will be perturbed normally about their nominal values, a number assigned as a train ID, the number of cars in the train, the expected arrival time of the train, offset from the beginning of the simulation interval, and a standard deviation about inbound train arrival time, which will be used with a normal distribution to vary train arrival times about their specified arrival times when the variable input schedule mode is chosen.

The standard deviation about inbound train arrival is not the same as the standard deviation of interarrival times or the standard deviation of train length. In the case of standard deviation of interarrival times and train length, entirely random schedules are generated corresponding to the means and standard deviations of train interarrival times and train lengths. In one embodiment, a defined schedule is used, but the arrival times of the trains may vary somewhat around the specified arrival times. Thus, a train arrival time could be perturbed to be greater than the arrival time of the next train in a sequence. When trains stay in sequence, the yard performance model slides later trains out when a given train arrival time will impact later trains. However, it only delays later trains as required, not all later trains.

Also, if a schedule time is shorter than the specified simulation interval, the program appends randomly generated arrivals and/or departures to the schedule in order to continue a flow into and out of the yard.

Furthermore, other parameters, all of which are not specified by the user, are utilized in the yard performance model. The backlog level at which congestive effects begin for any subyard and the maximum decay of task rate as congestion moves to 100% are parameters specified by the user. Since yard congestion typically does not affect the task rate of a carman, pin puller, longfielder, or brakeman, backlog level and maximum decay only apply to the proportion of each task rate which is contributed by engine crews. If an engine crew operates between two congested yards, for example, pulling blocks from classification to departure, then the congestion factor from both yards affect the associated task rate. The minimum backlog at which a yardmaster will consider moving labor, the borrowing limit below which a task backlog must be before the yard master can move labor from the task, and the task flow rates, are not user defined parameters. The borrowing limit parameter is typically set to 75% and only applies to the dynamic, headend-first labor assignment algorithm. For dynamic, backlog-first, labor can be borrowed from any task with a lower backlog than the borrowing task. Task flow rates are functions of the labor assigned to each task. Equations internal to the program provide this functional relationship and the forms and coefficients of the equations are not accessible to the user.

Figure 4:
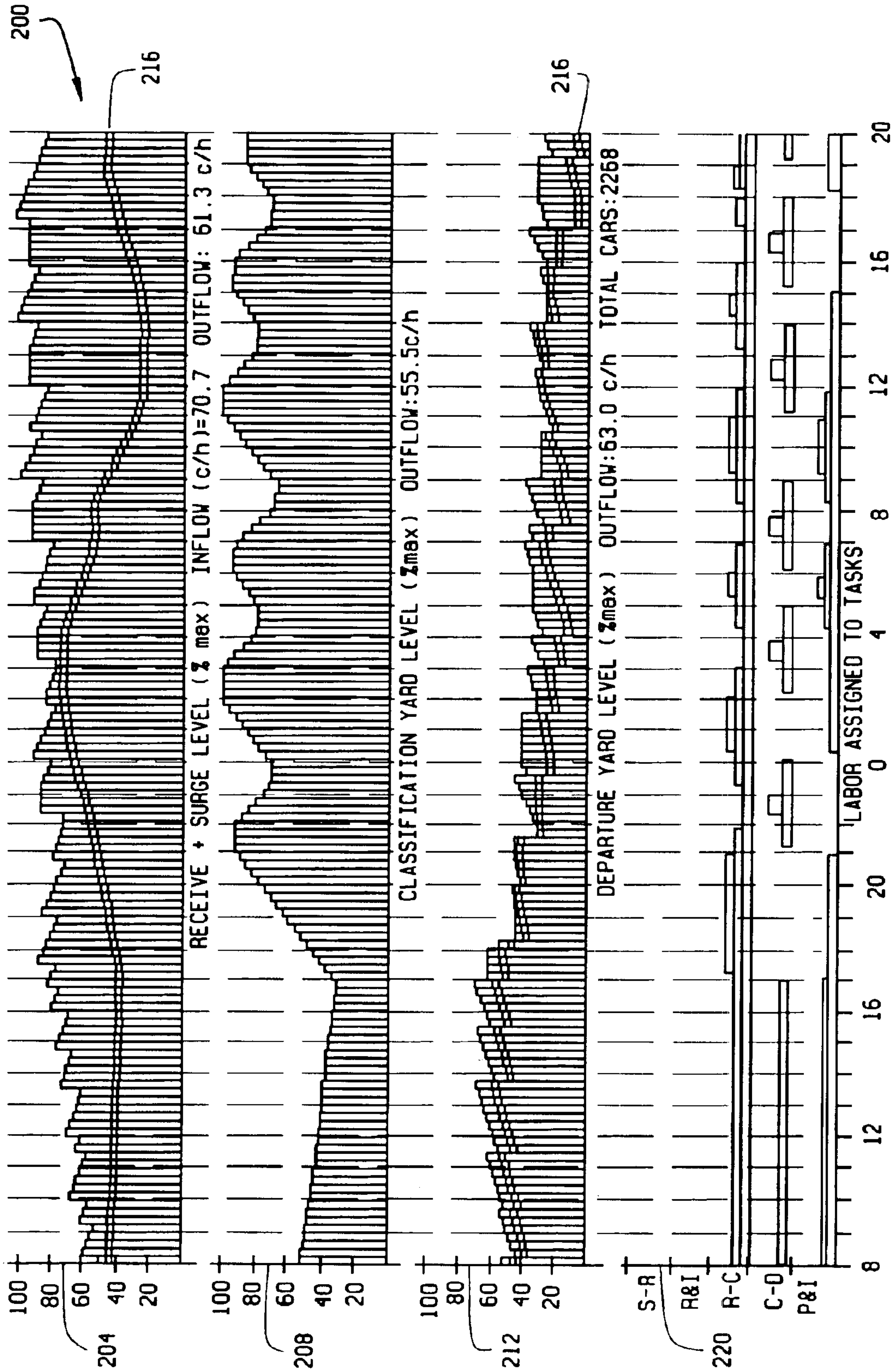
FIG. 4 shows a graphical representation depicting exemplary task loading in a railyard spread over 36 hours.

FIG. 4 shows a graph representation 200 depicting the task loading in a yard spread over 36 hours, based on the exemplary initial conditions shown in Table 1, above. A receiving loading bar graph 204, a classification loading bar graph 208, and a departure loading bar graph 212 depict subyard loading over time. The bars indicate backlogs below 60%, between 60% and 80%, between 80% and 100% , and at 100% saturation. The sawtooth effect in both the receiving yard bars and the departure yard bars reflects the discrete moments at which trains arrive and depart, respectively. Small squares 216, superimposed on receiving loading bar graph 204 and departure loading bar graph 212, reflect the percentage, as a fraction of each bar, of the cars that have been inspected for bad orders in receiving yard 30 (shown in FIG. 2), or are ready for departure from departure yard 38 (shown in FIG. 2). A labor management graph 220 depicts the labor management process for the duration of the simulation. At the left of graph 220 is an axis subdivided into equal intervals to represent each task. The abbreviations shown in graph 220 are given as, S-R—moving cars from the surge yard to the receiving yard, R&I—inspecting and removing power in the receiving yard, R-C—moving cars from receiving into the classification yard, C-D—moving blocks of cars from classification to departure, P&I—coupling brakes, adding power, and pressure-testing in departure.

The discontinuous bars of graph 220, shown for each task, represent labor assigned to each task over time. The varying thicknesses of the bars in graph 220 indicate more or less labor of the corresponding category assigned to a task. Graphs 204, 208, 212 and 220 provide a detailed look at the yard for the period of simulation, which aids in the understanding of what yard activities may be having a deleterious effect on throughput.

Figure 5:
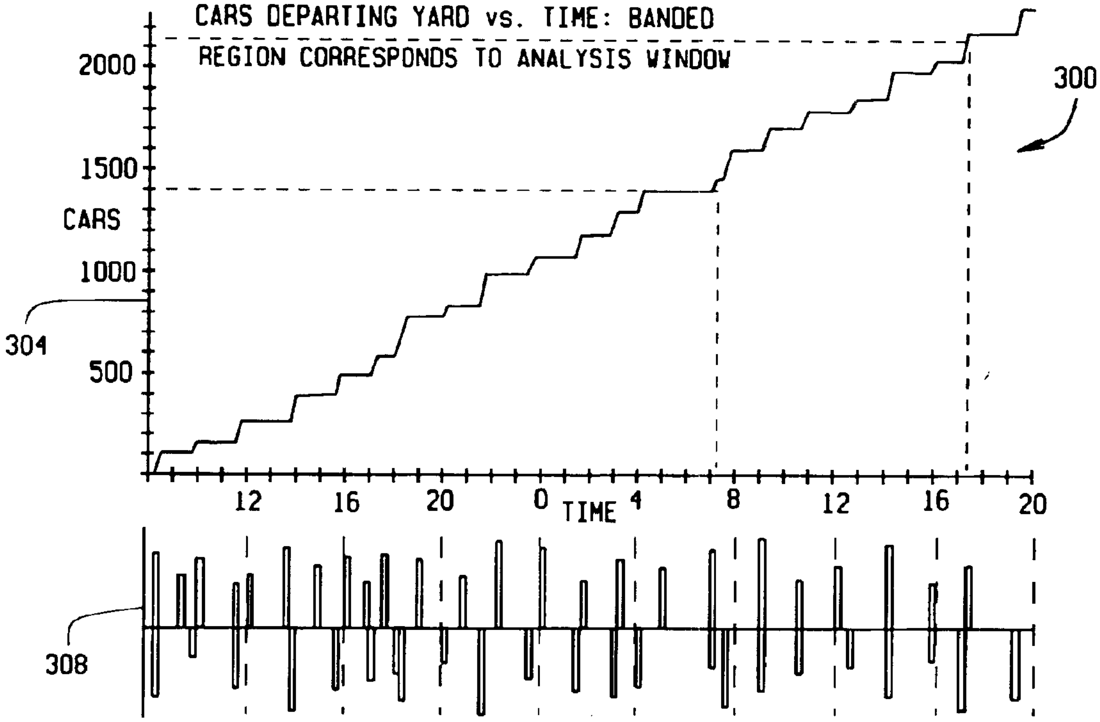
FIG. 5 shows a graphical representation depicting exemplary performance data for a railyard.

FIG. 5 shows a graphical representation 300 depicting exemplary performance data for a railyard in terms of its ability to service incoming and outgoing trains as per desired regional train schedules. A yard output graph 304 shows a yard output versus time plot, representing the number of cars departed from the yard over the time of the simulation. Graph 304 is effectively a step function because the cars are departed in discrete segments corresponding to the trains in an output schedule. A graph 308 indicates train arrivals and departures across the time interval of the simulation. The lengths of the vertical bars of graph 308 are proportional to the length of the train, with full scale corresponding to the maximum number of cars that could enter/leave a railyard in the simulation update interval. The full scale is based on the mean pull-in speed and car length. For graph 308, full scale is 165 cars. In graph 308, the bars above the horizontal axis represent arriving trains, and the bars below the axis represent departures. A train departure cannot occur on schedule if departure yard 38 (shown in FIG. 2) does not contain enough inspected cars at the scheduled departure time of the train. In that case, the train will be delayed.

Parametric Description of the Flow Model

Figure 6:
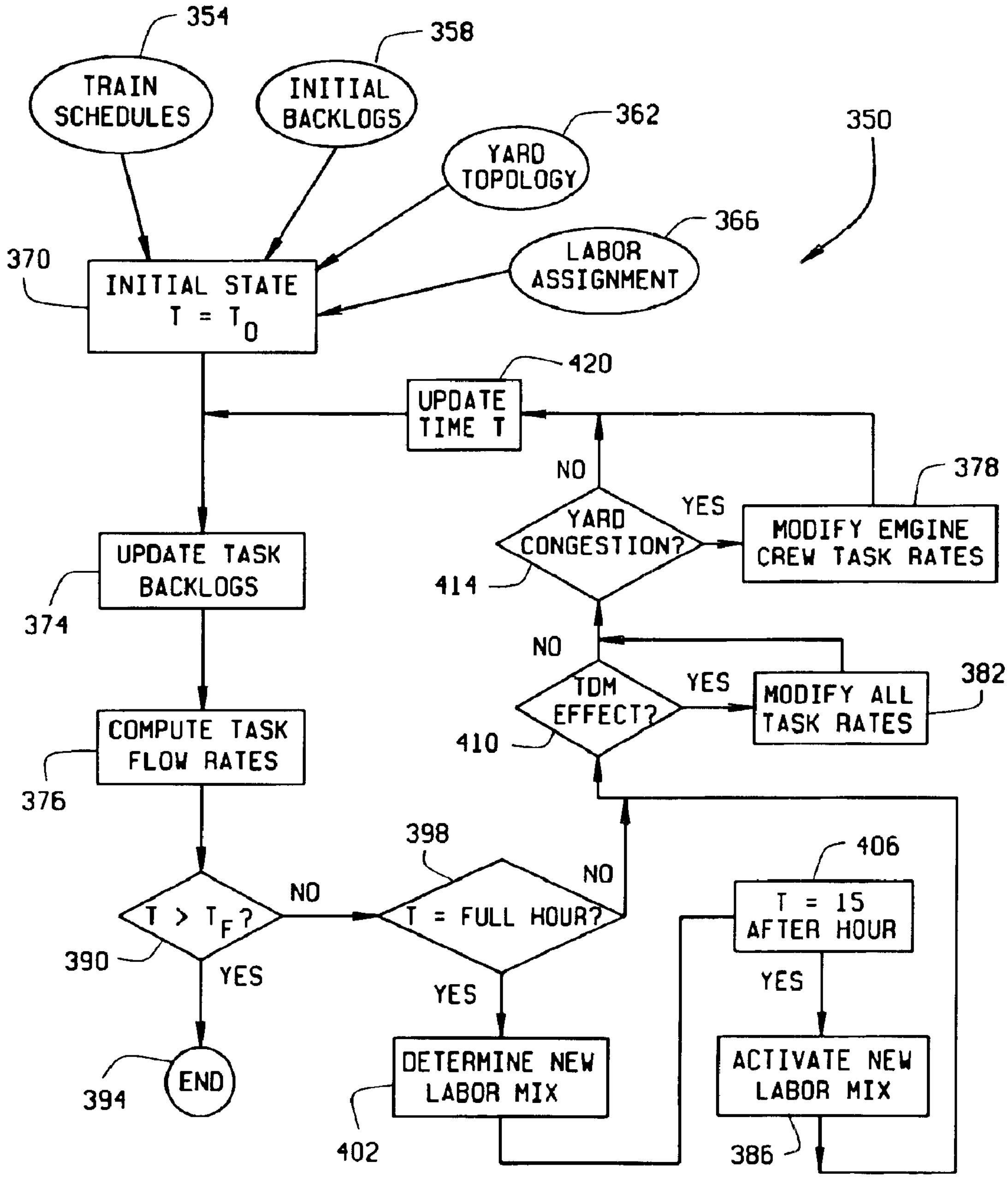
FIG. 6 shows flow a chart of the yard performance model.

FIG. 6 shows flow chart 350 of the yard performance model. The model is best described by partitioning the performance model into submodels. Once initial conditions, such as train schedules 354, initial backlogs 358, yard topology 362 and labor assignment 366 are input, the model calculates 370 the initial task flow rates based on an initial state as input by the user. A user, such as a yard master, utilizes user interface 22 and display console 18 (shown in FIG. 1) to access to all parameters of the model, except the non-user specified parameters discussed above, and may modify the default parameters either by cditing during program execution, or by recalling previously saved files for train schedules and yard parameters. $T_0$, of the initial state is the clock time at the yard in which the simulation begins. Next, the model updates 374 task backlog of each of the five tasks discussed in relation to FIG. 2 above, and computes or modifies 376 task flow rates. For example, the model advances cars to the next task, based on the flow rates in effect. This process begins with train departures, and works backward to the beginning of the yard. The task flow rates are updated in accordance with the varying yard conditions. Task backlog updates and task flow rate updates are done on a time increment of fifteen minutes, so that each task moves a corresponding number of cars to the next task. After each task backlog is updated, flow rates are updated, according to one or more flow modulating effects, such as, modifying 378 engine crew task rates, modifying 382 all task rates, and activating 386 a new labor mix. At the end of each task flow rate update, the time is checked 390, and, if it equals the end time of the simulation, the update loop ceases 394 and outputs the graphics shown in FIGS. 4 and 5 to display console 18 (shown in FIG. 1).

If the simulation time has not reached the endpoint, the model determines 398 if the time is an even hour, and if either of the dynamic labor modes have been chosen. If so, the yard master labor decision process is executed 402, whereby labor may be moved between tasks according to the labor assignment restrictions discussed above. However, the decision to move labor incurs 406 a fifteen minute penalty, during which time the reassigned personnel are in transit to the new assignment. If the time-dependent modulation mode has been selected 410, then the simulation time is compared to shift time to determine if the task flow rates should be modified, for example, decreased or increased. If any of the subyards have become congested 414 since the last update the appropriate adjustments are made to engine crew task rates affecting the engine crews working in the affected subyards. After the flow rate adjustments have been made, the simulation clock time is updated 420 by advancing the time by 15 minutes, and the main loop beginning with updating 374 task backlogs is repeated.

Referring to FIGS. 2 and 6, in one embodiment, updating task backlogs 374 involves updating the backlog of five tasks. For example, each incoming car which will be placed in an outbound train (1) must be pulled into receiving yard 30 from the main line or the surge yard (not shown), (2) must be inspected in receiving yard 30, (3) must be moved from receiving yard 30 to classification yard 34, (4) must be pulled, as part of a block, from classification yard 34 to departure yard 38, and (5) must have brake hoses attached to adjoining cars and have the brakes pressure-tested as part of an outbound train.

The yard performance model handles the task flow for these five tasks in reverse order, for example, the first task is to depart a train if the schedule so warrants, updating the backlog in the departure yard, and then the program works backward through tasks and backlogs to the first task.

Referring to FIG. 3, a railyard is modeled as comprising six separate subyards, with both receiving yard 30 and departure yard 34 (shown in FIG. 2) effectively comprising two subyards, one of cars inspected and a second of cars not inspected. The cars inspected in the receiving yard are referred to as cars in the RI subyard, and similarly, cars already inspected in the departure yard are referred to as cars in the DI yard. Although there are six logical subyards, there are seven flows, corresponding to the seven valves 84, 88, 92, 96, 100, 104 and 108, to modulate. These flow valves are denoted as inbound flow valve 84 , surge-to-receiving flow valve 88, RI flow valve 92, classification flow valve 96, departure flow valve 100, DI flow valve 104, and outbound flow valve 108. Inbound flow valve and outbound flow valve are not implicitly controlled by the yard, but represent the inbound and outbound trains scheduled by explicit predefined schedules. However, valves 88, 92, 96, 100 and 104 represent tasks that are modulated directly under the control of the yard.

In reference to FIGS. 7 through 17, the following variables are defined in accordance with the following list.

(A) Let $C_1, C_2, C_3, C_4, C_5, C_6$ be the maximum capacities, in cars, of each of the six subyards, for example, the surge, receiving, RI, classification, departure, and DI subyards, respectively.

(B) At any time t, let $L_1(t), L_2(t), L_3(t), L_4(t), L_5(t), L_6(t)$ be the occupancy, in cars, of each of the six subyards, (C) Let $R_1, R_2, R_3, R_4, R_5, R_6, R_7$ represent the maximum flow rates possible for each of the six subyards.

(D) At any time t, let $F_1(t), F_2(t), F_3(t), F_4(t), F_5(t), F_6(t), F_7(t)$ be the actual flow rates, in cars per minute, for each of the six subyards, and let □t represent the time increment (15 minutes) for each yard update.

(E) Let $A_1, A_2, \ldots, A_{NA}$, be the trains scheduled to arrive during the simulation period, with $T_A(A_i)$ being the arrival time for train $A_i$.

(F) Let $D_1, D_2, \ldots, D_{ND}$, be the trains scheduled to depart during the simulation period, with $T_D(D_i)$ being the scheduled departure time for train $D_i$.

(G) Let L(H) denote the length of any train H, in cars.

(H) Let E(t) represent the modulation factor applied to task flow rates at time t corresponding to TDM.

(I) Let $N_2$; $N_3$, $N_4$, $N_5$, $N_6$ be the nominal flow rates for the internal yard tasks (cars/minute), given nominal crewing, for the six subyards.

(J) Let $U_1(t), U_2(t), U_3(t), U_4(t), U_5(t)$ be the congestion factors for each of the engine crew or hostler time t, where the congestion factor is a value in the range [0,1 ] which indicates slowdown of engine crew or hostler activity due to the subyards being nearly or completely full.

More specifically, $U_1(t)$=slowdown of an engine crew for the surge-to-receive task, $U_2(t)$=slowdown of the hostler for the receive-to-classify task, $U_3(t)$=slowdown of the engine crew for the receive-to-classify task, $U_4(t)$=slowdown of the engine crew for the classify-to-departure task, and $U_5(t)$=slowdown of the hostler for the departure yard inspection task.

Figure 7:
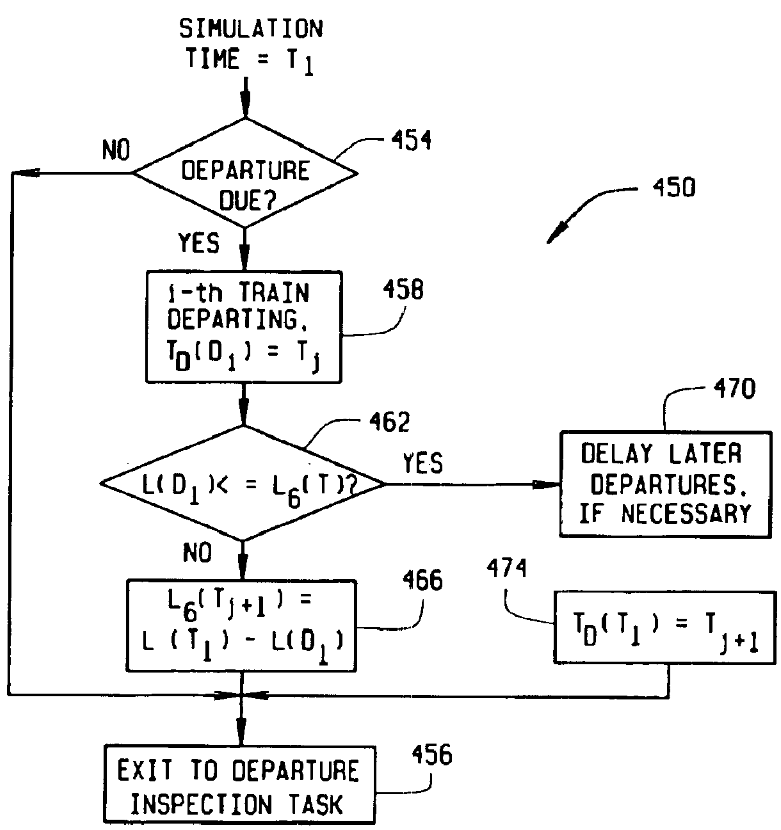
FIG. 7 shows a flow chart of the yard performance model logic for train departures.

FIG. 7 is a flow chart 450 of the yard performance model logic for train departures. When utilizing the yard performance model, a train departure depends on the train departure being scheduled at the corresponding moment of simulation time, and there being sufficient inspected cars in the departure yard to make up a train of the required length. $T_1, T_2, \ldots, T_j, T_{j+1}$, represent the sequence of discrete times at which all flows are updated. The yard performance model logic for train departures first checks 454 the departing train schedule to see if a train is due to depart at time Tj. If not, no further train departure logic is executed, and the model advances 456 to departure inspection task logic. Otherwise, train $D_i$ is scheduled 458 for departure. Next it is determined 462 if the number of cars $L(D_i)$ is less than or equal to the number of cars $L_6(T_j)$ ready for departure in the DI subyard. If no, then there are sufficient cars for the departing train, and it is departed, resulting in decrementing 466 the DI subyard level by the value L(Di). If the number of cars $L(D_i)$ is not less than or equal to the number of cars $L_6(T_j)$ ready for departure in the DI subyard, train $D_i$ is delayed 470 by a time set 474 to at least time $T_{j+1}$, and any following trains which might be departing in consecutive time slots from $T_{j+1}$ outward will be pushed back one slot. The model then advances 456 to departure inspection task flow logic.

Figure 8:
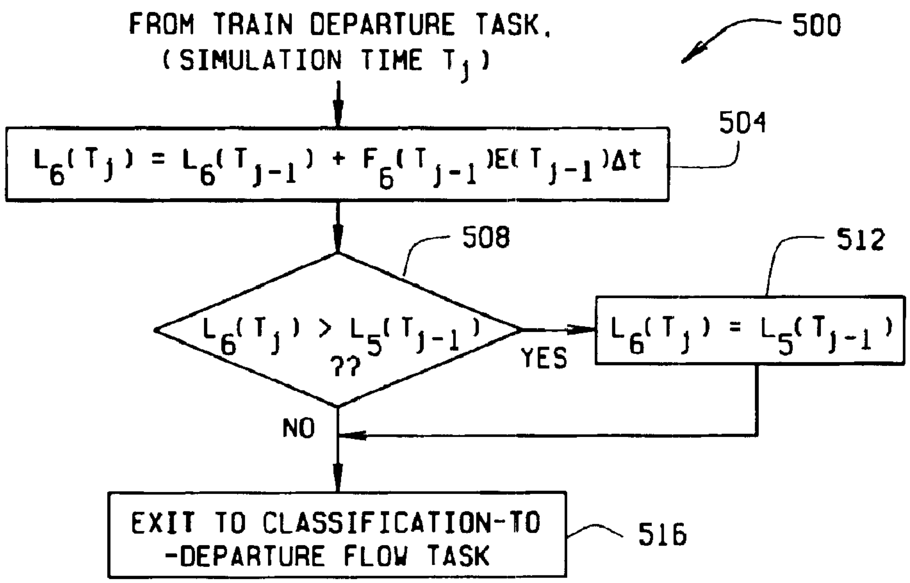
FIG. 8 shows a flow chart of the yard performance model logic for train departure yard inspection task flow.

FIG. 8 is a flow chart 500 of the yard performance model logic for train departure yard inspection flow. The departure yard train inspection moves trains from departure yard reservoir 76 to the DI yard reservoir 80 (shown in FIG. 3) according to the current flow rate for the inspection task, modified 504 by the TDM factor. The only constraint is that the total backlog of inspected cars cannot exceed 508 the total number of cars in departure yard 38 (shown in FIG. 2). If so, the model sets 512 total backlog of inspected cars equal to the total number of cars in departure yard 38, and the model advances 516 to classification-to-departure task flow logic.

Figure 9:
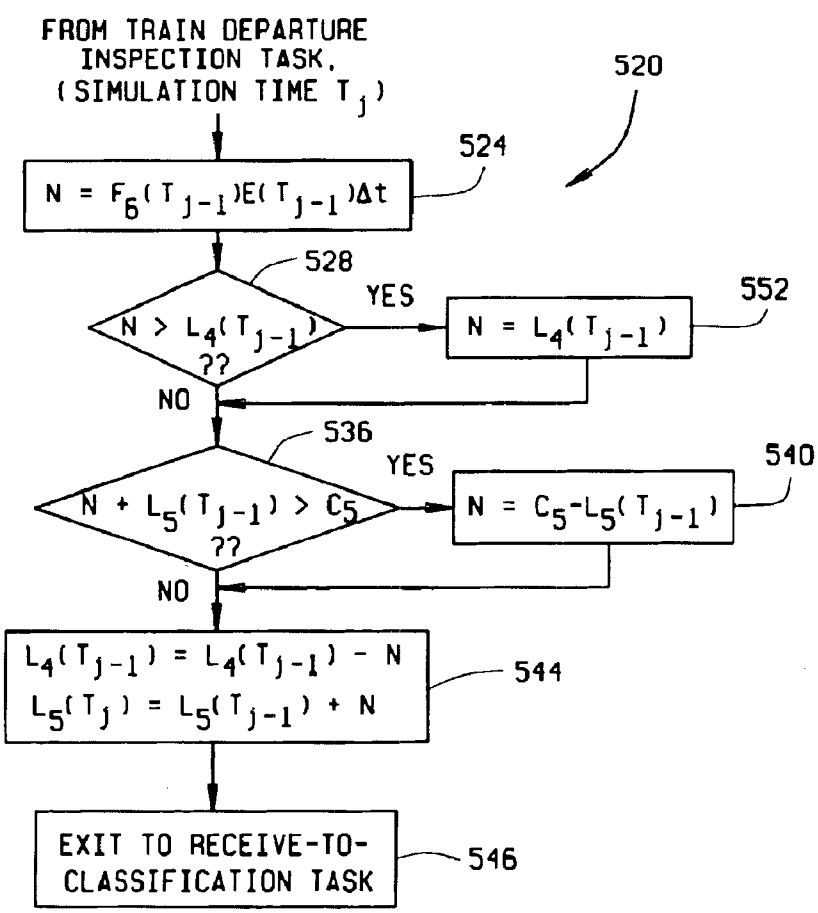
FIG. 9 shows a flow chart of the yard performance model logic for classification-to-departure yard task flow.

FIG. 9 is a flow chart 520 of the yard performance model logic for classification-to-departure yard flow. The basic classification-to-departure yard car flow attempts to move the number N of cars corresponding 524 to the flow rate and simulation update time interval Δt. However, N is subject to two constraints. N can not exceed 528 the number of cars available in classification yard reservoir 72 (shown in FIG. 3). If N exceeds the number of available cars, the model sets 532 N equal to the number of cars available in classification yard reservoir 72. Additionally, departure yard reservoir 76 (shown in FIG. 3) must have adequate room to accommodate 536 N more cars. If the departure yard reservoir 76 does not have adequate room, the model sets 540 N equal to the available room. N is then modified 544 downward, if necessary, the car levels for classification reservoir 72 and departure yard reservoir 76 are then updated accordingly, and the model advances 546 to receive-to-classification task flow logic.

The basic receive-to-classification yard flow is similar to the classification-to-departure yard task flow shown in FIG. 9. Receive-to-classification flow attempts to move the N cars corresponding to the flow rate and simulation update time interval Δt, from RI reservoir 68 (shown in FIG. 3) to classification yard reservoir 72. However, N is subject to two constraints. N can not exceed the number of cars available in RI reservoir 68, and classification yard reservoir 72 must have adequate room to accommodate N more cars. N is then modified downward, if necessary, and the car levels for RI reservoir 68 and classification yard reservoir 72 are updated accordingly. The logic diagram for this process is identical to that of FIG. 10, except for decrementing all subscripts by 1.

Figure 10:
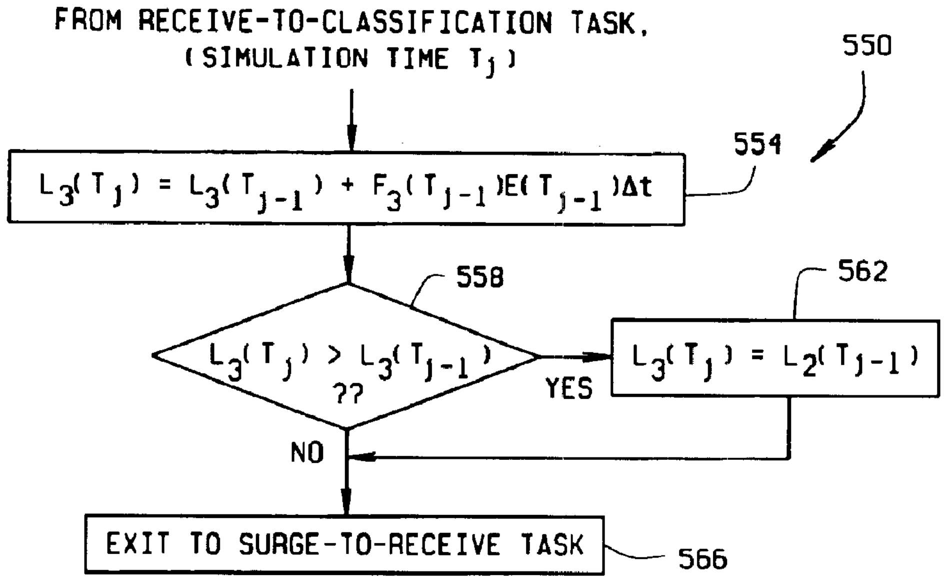
FIG. 10 shows a flow chart of the yard performance model logic for train receive yard inspection flow.

FIG. 10 is a flow chart 550 of the yard performance model logic for train receive yard inspection flow. The receive yard train inspection moves trains from receive yard reservoir 64 to the RI yard reservoir 68 (shown in FIG. 3) according to the current flow rate for the inspection task, modified 554 by the TDM factor. The only constraint is that the total backlog of inspected cars cannot exceed 558 the total number of cars in receiving yard 38 (shown in FIG. 2). If so, the model sets 562 total backlog of inspected cars equal to the total number of cars in receiving yard 38, and the model advances 566 to surge-to-receive task flow logic.

The logic for the surge-to-receive yard car movement task is identical to that for the classification-to-departure yard tasks discussed in reference to FIG. 10. The surge-to-receive model logic is demonstrated by uniformly decrementing all subscripts in FIG. 10 by 3.

Figure 11:
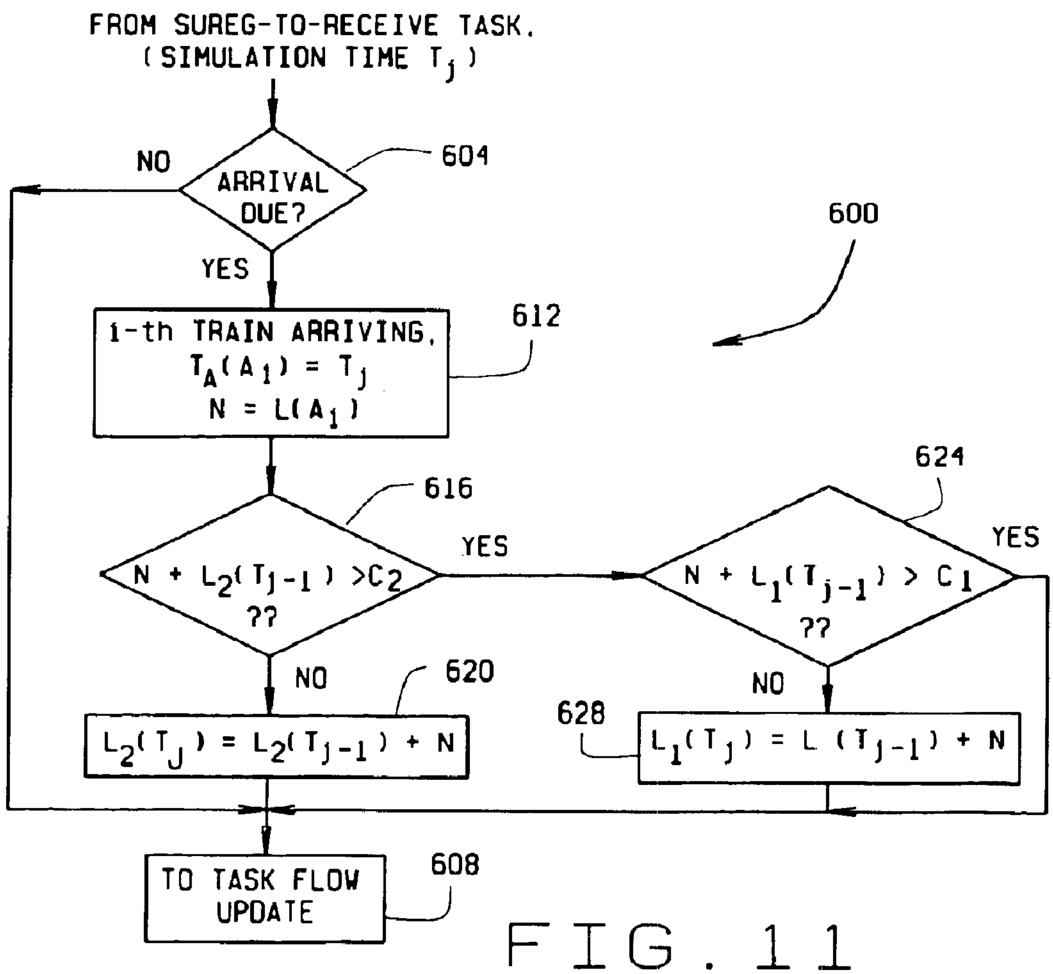
FIG. 11 shows a flow chart of the yard performance model logic for inbound train flow.

FIG. 11 is a flow chart 600 of the yard performance model logic for inbound train flow. The yard performance model logic for inbound trains first checks 454 the inbound train schedule to see if a train is due at time Tj. If not, no further inbound train logic is executed, and the model advances 608 to the task flow update logic (shown in block 374 of FIG. 6). Otherwise the receive or surge yard car count is updated 612 by the number of cars in the arriving train. Typically, an inbound train goes to receive yard reservoir 64 (shown in FIG. 3) if there is room, otherwise the inbound train goes to surge yard reservoir 60 (shown in FIG. 3) if there is room, and failing either of those alternatives, the train is not accounted for, for example, it is regarded as left out on the main line. Next it is determined 616 if the number of inbound cars is greater than the capacity of receiving yard reservoir 64. If not, then there is sufficient room, and the train is moved to receiving yard reservoir 64, the level of receiving yard reservoir 64 is incremented 620, and the model advances 608 to task flow update logic. If the number of incoming cars is greater than the capacity of receiving yard reservoir 64 the model determines if the number of incoming cars is greater than the capacity of surge yard reservoir 60. If not, then there is sufficient room, and the train is moved to surge yard reservoir 60, the level of surge yard reservoir 60 is incremented 628 and model advances 608 to task flow update logic.

In FIG. 6, blocks 402 and 386 indicate that a yard master may reallocate labor on every hour, measured from the beginning of simulation time, if either of the dynamic labor assignment modes, for example, dynamic, headend first, or dynamic, backlog first, has been chosen. Otherwise, the process is effectively null, and labor remains constant for the entire simulation. Two major factors effect labor allocation, (1) task flow rates as a function of labor assignment and (2) yard master labor allocation algorithms.

Task flow rates as a function of labor assignment involve the yard tasks of surge-to-receive movement, receive yard car inspection, receive-to-classification car movement, classification-to-departure car movement, departure yard train building. The arrivals and departures of trains from the yard are not considered a yard task. Each task has a default nominal flow rate based on a nominal crewing assignment, and these nominal flow rates can be altered by the user to reflect conditions at any yard of interest. Associated with each nominal flow rate is a nominal crew assignment, which is fixed by the model. These nominal crew assignments are as follows, (1) Surge-to-Receive Car Flow—1 engine crew;

(2) Receive Yard Car Inspection—1 carman;

(3) Receive-to-Classification Car Flow—1 engine crew, 1 pinpuller, ½ hostler;

(4) Classify-to-Departure Car Flow—1 engine crew, 1 longfielder;

(5) Departure Train Building—½ hostler, 1 brakeman.

The yard performance model expresses each task in terms of task flow rate equations. Each flow rate equation is expressed in terms of the nominal flow rates, congestive factors, and the actual labor assignment to the task at any moment; the TDM modulation also affects task rates, but is handled extrinsically to the task flow equations.

The surge-to-receive flow rate involves the labor category of engine crews (EC). The equation providing the flow rate for cars from the surge yard to the receive yard is given by $$F_2(N_{EC}(t)) = N_2 U_2(t) \sum_{i=1}^{N_{EC}(t)} 2^{i-1}, \quad (1)$$

where $N_{EC}(t)$=the number of engine crews assigned to surge-to-receive car flow at time t.

The summation of powers of two in this equation provides a diminishing return for additional engine crews. The first crew assigned counts as 1 crew, the next as ½ of a crew, and so forth, because multiple engine crews will be somewhat self-congestive. This self-congestive effect will be used in some of the following equations.

When considering the receiving yard car inspection flow rate, the carman operating in the receiving yard are not regarded as affected by a yard congestion factor, or by the presence of more carmen operating in the receiving yard. Therefore, the equation for the inspection task flow rate is linear, and given by $$F_3(N_{CM}(t))=N_3N_{CM}(t), \quad (2)$$

where $N_{CM}(t)$=the number of carmen assigned to receive yard car inspection at time t.

The receiving-to-classification yard car flow depends on the presence of a pinpuller, an engine crew, and the hostler who is removing the power from incoming trains. Without an engine crew or pinpuller, there can be no flow at all into the classification yard. However, the absence of the hostler decreases the flow, but does not force it to zero, because the road crews arriving with the inbound train may be induced to move power from the incoming trains to the service area. Reflecting these facts, the equation for car flow is given by if $N_{EC}(t)$=0 or $N_{PP}(t)$=0, then flow rate is zero, otherwise $$F_4(N_{EC}(t), N_{PP}(t), N_{HS}(t)) = \left\{ \begin{array}{l} 0 \\ N_4 \end{array} \left[ 0.4 + \left( 0.4U_3(t) \sum_{i=1}^{N_{EC}(i)} 2^{i-1} + 0.2U_2(t) \sum_{i=1}^{2N_{HS}(i)} 2^{i-1} \right) \right] \right. . \quad (3)$$

where $N_{EC}(t)$=number of engine crews assigned to classification at time t, $N_{PP}(t)$=number of pinpullers active at time t, and $N_{HS}(t)$=number of hostlers operating at the receive end of the yard at time t.

The classification-to-departure yard flow requires an engine crew and, optionally, a longfielder. The absence of the engine crew results in a zero flow rate even if a longfielder is present. The equation for this flow is given by if $N_{EC}(t)$=0 then flow rate is zero, otherwise $$F_5(N_{EC}(t), N_{LF}(t)) = \left\{ \begin{array}{l} 0 \\ N_5 \end{array} \left( U_5(t) \sum_{i=1}^{N_{EC}(i)} 2^{i-1} + 0.2N_{LF}(t) \right) \right. , \quad (4)$$

where $N_{EC}(t)$=number of engine crews assigned to the trim process at time t, and $N_{LF}(t)$=number of longfielders assigned to the trim process at time t. In this case the nominal labor rate is realized with just an engine crew assigned, and the longfielder increases the nominal car flow rate by 20%.

The departure yard train building flow depends on brakemen, to couple brake hoses and pressure test the brakes, and a hostler to mate power to the departing trains. In the departure yard train building flow, the brakeman is indispensable. Therefore, the flow rate is zero if there is no brakeman assigned. However, the hostler is not absolutely necessary, since the road crews assigned to the departing trains may also bring power to the train. The equation for departure yard train building flow is given by $$F_6(N_{BM}(t), N_{HS}(t)) = \left\{ \begin{array}{l} 0 \quad \text{If } NBM(t)=0, \text{ then the flow rate is zero, otherwise} \\ N_6\left(0.5U_6(t) \sum_{i=1}^{2N_{HS}(i)} 2^{i-1} + 0.5N_{BM}(t) + 0.2\right) \end{array} \right. , \quad (5)$$

where $N_{BM}(t)$=number of brakemen assigned at time t, and $N_{HS}(t)$=number of hostlers assigned at time t.

The yard master labor allocation algorithms of the yard performance model define the manner by which labor is reassigned during a simulation. The model permits three choices of labor allocation, static, headend first, and backlog first. In the static model labor is not reassigned at all during the simulation.

If labor is reassigned, it is reassigned to alleviate backlogs in the tasks, because such backlogs can lead to congestive effects in the yards, or to a task being unable to move cars forward through the process due to the next task having no storage room remaining for incoming cars. Therefore, headend first or backlog first labor allocation is used. Headend first method gives priority to backlogs near the front of the yard before backlogs toward the end of the yard. The reasoning behind this method is that if the front of the yard is saturated, then inbound trains remain out on the mainlines or sidings, which is the most undesirable situation.

The backlog first method addresses the maximum backlog first, where backlog is defined as the percent by which a task is backlogged relative to the total capacity of cars that the corresponding task can accommodate.

Since inspection tasks differ from the actual car flow tasks in terms of what backlog means, the following equations express the backlogs at time t for each task. The backlog for the surge-to-receive task is given by $$B_2(t)=L_1(t)/C_1. \quad (6)$$

The backlog for the receive yard car inspection task is given by $$b_3(T) = \begin{cases} 0 \text{ if } L_2(t) = 0 \\ 1 - L_3(t)/L_2(t) \text{ otherwise} \end{cases} . \quad (7)$$

The backlog for the receive-to-classification car flow-backlog is given by $$B_4(t)=L_2(t)/C_2. \quad (8)$$

The backlog for the classification to departure yard car flow is given by $$B_5(t)=L_3(t)/C_3. \quad (9)$$

The backlog for the departure yard train building task is given by $$B_6(t) = \begin{cases} 0 \text{ if } L_5(t) = 0 \\ 1 - L_6(t)/L_5(t) \end{cases}. \quad (10)$$

The above definitions of backlogs are used for either of the dynamic labor assignment algorithms, for example, the headend first method or the backlog first method. The dynamic labor assignments uses the following definitions, (1) $B_L$=the backlog level at or above which an attempt will be made to obtain labor for the corresponding task ($B_L$=0.8), and (2) $B_B$=the backlog limit at or below which it is acceptable to borrow labor from the corresponding task ($B_B$=0.75).

Labor categories within the yard are not completely fungible. The matrix in Table 2, below, indicates what labor categories are interchangeable, and from which tasks labor of a given category may be drawn when a reassignment occurs. The headings across the top of the matrix represent the five tasks of moving cars the surge yard to the receiving yard, moving cars from the receiving yard to the RI yard, moving cars from the RI yart to the classification yard, moving cars from the classification yard to the departure yard, and moving cars from the departure yard to the DI yard. The labor available in any cell may be reassigned to the other tasks with an 'X' in the same row.

TABLE 2

| | Tasks | | | | |
|---|---|---|---|---|---|
| Labor Type | S-R | RI | R-C | C-D | DI |
| EC | X | | X | X | |
| HS | | | X | | X |
| CM | | X | | X | X |
| PP | | | X | | |
| LF | | X | | X | X |
| BM | | X | | X | X |

As shown in Table 2, when labor is to be reassigned, it is, in all cases except one (hostlers), obtainable from exactly two other tasks. Therefore, the model algorithm that reassigns labor uses a subalgorithm, which sorts out which of two choices is best for the reassignment.

Figure 12:
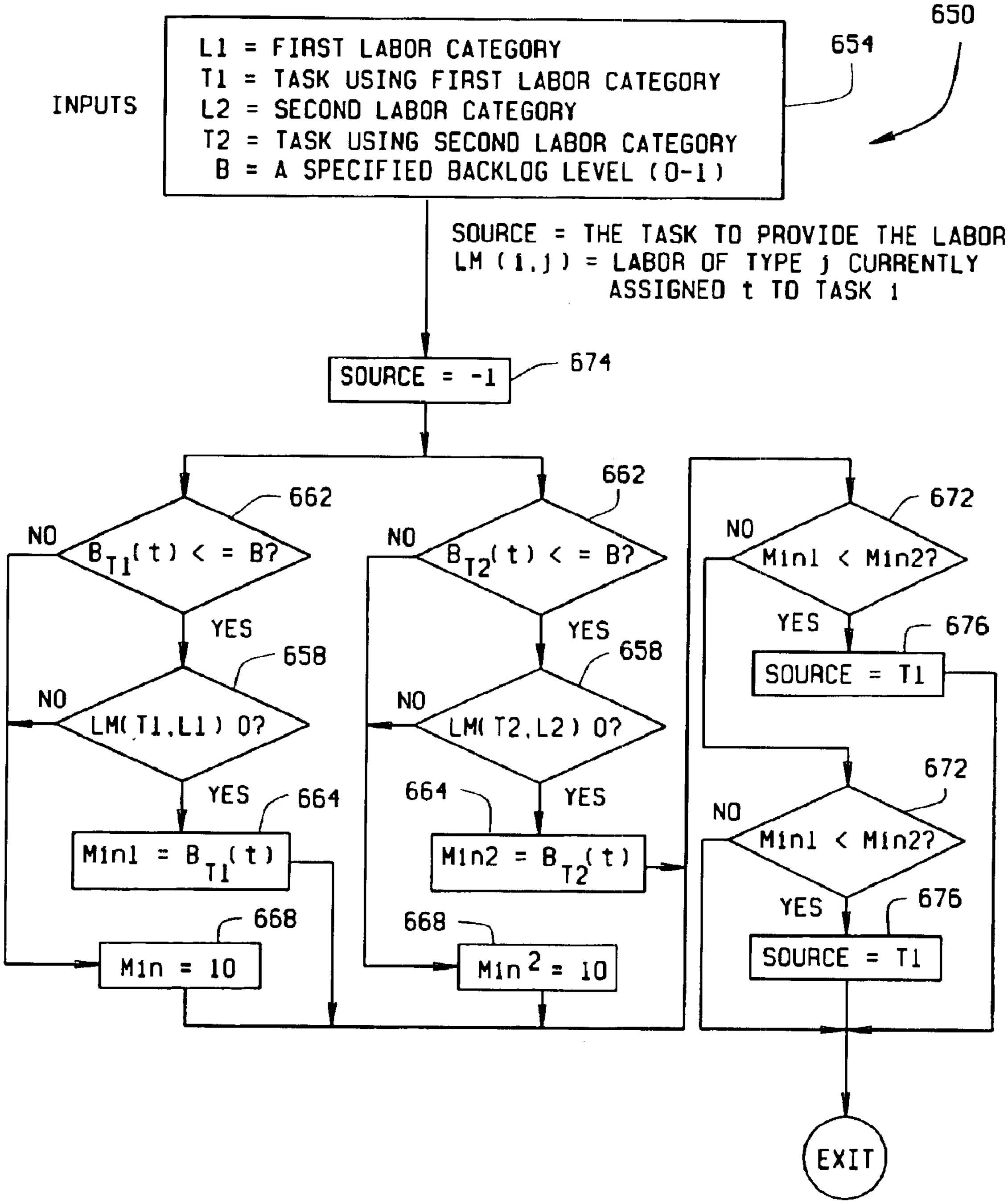
FIG. 12 shows a flow chart of a sub-algorithm for sorting which of two choices is best for labor reassignment.

FIG. 12 is a flow chart 650 of the subalgorithm for sorting out which of two choices is best for labor reassignment. The subalgorithm accepts 654 as input two labor categories, two tasks, and the backlog of the task for which labor is being potentially recruited. Next the subalgorithm determines if either or both of the tasks from which labor may be recruited have any labor of the required category 658, or have backlogs less than a specified backlog 662. Both of these criteria must be met for a task to be able to supply labor 664. If both criteria are not met the subalgorithm sets 668 the task choice backlog to a value of 10. Next the task choices are compared 672 and the one with the lower backlog is chosen 676. If neither of the task choices have labor that may be recruited or have backlogs less than a specified backlog, the subalgorithm returns 674 a negative task number, signifying that labor of the categories desired cannot be borrowed from the candidate tasks. The subalgorithm is denoted by $$L=(T_1, T_2, L_1, L_2, B) \quad (11)$$

where $T_1$ and $T_2$ are the tasks from which labor might be borrowed, $L_1$ and $L_2$ are the labor types to be borrowed, respectively from $T_1$ and $T_2$, and B is a backlog level below which a donor task can permit borrowing.

Also, the indexing of tasks and labor categories in the following discussion will correspond to the entries in the matrix of FIG. 13, with the upper left (blank) cell corresponding to (0,0).

The headend first algorithm (HFA) checks the backlogs of the tasks, in order from the front of the yard, for example, surge-to receive car movement, to the end of the yard, for example, brake coupling and inspection in the departure yard. The HFA then attempts to move labor from other tasks to aid any task with a backlog greater than $B_L$=80%. However, the attempted borrowing process differs somewhat from one task to the other. Borrowing of labor will only be permitted from tasks with backlogs below $B_B$=75%.

As shown in Table 2, enhancing the flow rate from surge-to-receiving yard requires additional engine crews. Thus, labor in the form of engine crews (labor type 1) is borrowed either from the reccive-to-classification task or the classification to departure task. The subalgorithm function is called to determine which (if either) of the tasks might supply the engine crew, returning that choice as the value of the variable "min". If min <0, no labor can be obtained. Otherwise, the affected labor matrix entries LM(i,j) are modified to reflect movement of an engine crew from the donor task to the surge-to-receive yard task.

The receive inspection task can borrow either a longfielder or a brakeman, converting those labor categories to the carman category. The subalgorithm determines which, if either, of the longfielder or brakeman will be borrowed, and, if either is available, the labor matrix is updated accordingly.

The receive-to-classification yard flow differs from the previous cases in that it normally relies on two labor categories, engine crews and hostlers. The engine crews can be obtained from either of two other tasks. Thus, the subalgorithm looks for an engine crew in surge-to-receivc task or the classify-to-departure task, and, if a crew is available, updates the labor matrix accordingly.

The search for additional support from the hostler is different, since the hostler(s) are only involved in one other task, and the subalgorithm function does not apply. However, typically a yard has one hostler acting to support both tasks involving hostlers. Thus hostlers can be moved in fractions of ½, for example, the single hostler serving two tasks may be placed exclusively on one task, changing his effect in increments of 0.5.

The classification-to-departure yard car flow depends on longfielders and engine crews. This task flow has the property that it will be zero (no car flow) if there is no engine crew, even if a longfielder is available. Therefore, the logic for this process is to first obtain, if possible, an engine crew, and then only look for longfielder support if the task has at least one engine crew assigned. A longfielder is sought only if at least one engine crew will be assigned to this task, and that longfielder can be obtained by converting a carman or brakeman to longfielder duty. Thus, the subalgorithm function is applied to determine which, if either, category of labor will be converted.

Additionally, in the classification-to-departure task, a longfielder without an engine crew has no value and the task flow is zero. Therefore a yard master should not remove the last engine crew from the classification-to-departure task without reassigning the longfielder as well.

The departure inspection task depends on both hostlers and brakemen. A brakeman can be obtained by converting either a longfielder or carman to brakeman service. Therefore, the subalgorithm function is used to choose from where the additional brakeman is acquired.

As a final action of the HFA, the subalgorithm checks to see if the longfielder is without an engine crew, and if so, the longfielder is converted to a carman or brakeman. The specific alternative chosen is to favor the recipient task with the highest current backlog.

The only distinction between the HFA and the Backlog First Algorithm (BFA) is that the HFA proceeds through the tasks in car flow order to determine whether to move labor, while the BFA first reorders the tasks so that labor is reassigned to tasks with the order of reassignment decision corresponding to the task backlogs in descending order. Thus the subalgoritym for the BFA first creates an ordered list of the tasks, corresponding to descending backlogs, and then applies the same logic as applied in the HFA, except that the order of labor reassignments follows the ordered task list.

However, there is one other distinction. The HFA uses fixed backlog thresholds to determine which tasks may be donors, and which recipients, corresponding to the backlog levels $B_B$=75% and $B_L$=80%, respectively. The BFA uses the same threshold for recipient tasks, but allows a donor task to be any task with a backlog lower than the current backlog of the recipient task.

The labor reassignment in either HFA or BFA cannot be cyclic, such that, one task may not borrow and then later be made to return a crew member within the same reassignment cycle. The ordering of donor versus recipient backlog thresholds prevents this from occurring.

There is a delayed effect of labor reassignment in that a labor reassignment decision pays a penalty of transport time for those crew members moving to new tasks. Thus, the new values of the labor mix do not take effect immediately, but are delayed by one simulation cycle, of $\Delta t$=15 minutes. Therefore, in the next iteration of task flow after the labor reassignments, the labor contingent will be lower than the entire crew available in the yard, which will be reflected in the flow rates for that time interval. Thereafter, until the next labor reassignment, the flow rates will reflect all yard labor, as reassigned.

The congestive effect only applies to engine crews and hostlers, and only affects task rates in proportion to the contribution of the engine crew or hostler to the overall task rate. The congestion factors applicable to the five yard tasks involving engine crews and hostlers, are included in the task flow rate equations (1) through (5).

The congestive effect is determined by two parameters, given as $C_B$=a level of task backlog at which the congestive effect first begins, and $C_T$=the maximum decay in engine crew/hostler efficiency caused by congestion, when the corresponding subyard backlog reaches subyard capacity.

Each engine crew operates between two subyards, and if both of those subyards are congested, the congestive effects of both subyards are applied as multiples to the nominal engine crew contribution to the task. Thus, the values $U_1(t)$, . . . $U_5(t)$ are themselves products of two subyard congestion factors. Although the entire yard is divided into six subyards in the flow model, the RI and DI subyards do not create congestion effects, since the backlogs in these yards are not directly related to the physical capacity for car storage in any physical subyard. For each of the physical subyards, let $F_1(L_1(t)/C_1)$=congestion factor for the surge yard at time t, $F_2(L_2(t)/C_2)$=congestion factor for the receiving yard at time t, $F_4(L_4(t)/C_4)$=congestion factor for the classification yard at time t, and $F_5(L_5(t)/C_5)$=congestion factor for the surge yard at time t.

(PLEASE CLARIFY IF THE LAST EQUATION SHOULD HAVE SUBSCRIPTS OF '6' AND SAY "FACTOR FOR THE DEPARTURE YARD")

These factors are parameterized in terms of the their current backlogs, and each factor is defined by the equation $$F_i(L_i(t)/C_i) = \begin{cases} 1 & \text{if } L_i(t)/C_i \le C_B \\ 1 - C_T\left(1 - \cos\left(\frac{\pi}{2(1-C_B)}\left(\frac{L_i(t)}{C_i} - C_B\right)\right)\right) & \text{otherwise,} \end{cases} \tag{12}$$

where (for i=1,2,4,5).

Therefore, the congestive effect has no effect until the threshold level $C_B$ is reached, and then descends as a cosine curve from 1 to the maximum effect of 1—CT over the remaining part of the backlog range. Additionally, the factors $F_i(L_i(t)/C_i)$ must be related to the values $U_i(t)$. Specifically, $$U_1(t)=F_1(L_1(t)/C_1)F_2(L_2(t)/C_2),$$

$$U_2(t)=F_2(L_2(t)/C_2),$$

$$U_3(t)=F_2(L_2(t)/C_2)F_4(L_4(t)/C_4),$$

$$U_4(t)=F_4(L_4(t)/C_4)F_5(L_5(t)/C_5), \text{ and}$$

$$U_5(t)=F_5(L_5(t)/C_5). \tag{13}$$

The TDM Effect

The time dependent modulation (TDM) effect, represents a variation in apparent labor rates during the course of a shift. It is an optional effect in the yard performance model. The TDM effect represents the fact that normally, the labor rates are higher in the early part of a shift, and decrease toward the end of the shift. It is parameterized in the program in terms of three parameters, $T_S$=time of shift initiation for any shift, $T_D$=time after beginning of shift that labor rates decrease, p=the proportional labor rate decrease from the labor rate observed in the early part of the shift.

Using a nominal task flow rate of r for any task, for example, an average over a full shift, the task flow rate for any task must be elevated above the nominal rate assigned by a certain amount for the period of time before the rate decreases, so that the overall mean task rate does conform to the nominal rate listed on the parameters page. Specifically, if $R_{hi}$ represents the higher than nominal rate observed in the early part of a shift, and $R_{lo}$ represents the lower than nominal rate observed in a latter part of the shift, then for a shift of length $T_L$, $$R_{hi}\left(\frac{T_D}{T_L}\right) + R_{lo}\left(\frac{T_L - T_D}{T_L}\right) = r, \tag{14}$$

which can be expressed as $$R_{hi}\left[\left(\frac{T_D}{T_L}\right) + p\left(\frac{T_L - T_D}{T_L}\right)\right] = r,$$

from which $$R_{hi} = \frac{rT_L}{T_D(1-p) + T_L p}, \text{ and} \tag{15}$$

are obtained.

In an exemplary embodiment, using the TDM parameters specified in Table 1, a nominal task rate r will be elevated to 1.0526r for 6 hours, and then will decrease to 0.8421r for 2 hours. The mean task rate is then [6(1.05r)+2(0.84r)]/8=r, and 0.84r/1.05r=0.8. During each task flow update in the simulation, the yard performance model determines whether the current simulation time is in the high task rate, or the low task rate part of a shift. If the simulation time is in the early part of the shift, all task rates are elevated from the nominal rates corresponding to r, as defined for equations 14–15, to $R_{hi}$, as given by equation 15 and for the latter part of the shift, all task rates are decreased from their nominal rates r to $R_{lo}$, as given by equation 15.

While the invention has been described in terms of various specific embodiments, those skilled in the art will recognize that the invention can be practiced with modification within the spirit and scope of the claims.

What is claimed is:

1. A method for managing railcar movement in a railyard based on the flow of railyard tasks, using a system including a computer that includes a processor, a memory device, and a database, the railyard including six subyards, said method comprising the steps of:

inputting initial parameters to the computer;

simulating railyard task flow utilizing a yard performance model and the initial parameters; and determining if a train schedule can be met based on the simulated yard task flow.

2. A method in accordance with claim 1 wherein the six subyards include a surge yard, a receiving yard, a receiving inspected (RI) yard, a classification yard, a departure yard and a departure inspected (DI) yard, said step of inputting initial parameters to the computer comprises the steps of:

inputting a simulation ending time ($T_f$);

inputting at least one train schedule parameter;

inputting a time dependent modulation (TDM) parameter;

inputting at least one initial task backlog parameter;

inputting at least one yard topology parameter; and inputting at least one initial labor assignment parameter.

3. A method in accordance with claim 2 wherein the railyard tasks include at least one of surge-to-receive railcar movement, receive yard inspection, receive-to-classification railcar movement, classification-to-departure railcar movement, and departure yard inspection, said step of simulating railyard task flow utilizing a yard performance model includes the step of executing a railyard performance algorithm.

4. A method in accordance with claim 3 wherein said step of executing a railyard performance algorithm comprises the steps of:

initializing a time (T) equal to the clock time at the railyard in which the simulation is to begin;

updating task backlogs based on the initial parameters;

computing task flow rates based on the updated task backlogs; and determining whether time (T) equals simulation ending time ($T_f$).

5. A method in accordance with claim 4 wherein said step of determining if a train schedule can be met comprises the steps of:

verifying that time (T) does equal simulation ending time ($T_f$); and calculating a train schedule based on the computed task flow rates.

6. A method in accordance with claim 4 wherein said step of simulating railyard task flow further comprises the steps of:

verifying that time (T) does not equal simulation ending time ($T_f$); and executing a railyard performance algorithm subroutine.

7. A method in accordance with claim 6 wherein said step of executing a subroutine further comprises the steps of:

re-updating task backlogs;

re-computing task flow rates based on the re-updated task backlogs; and determining whether time (T) equals simulation ending time ($T_f$).

8. A method in accordance with claim 7 wherein said step of re-updating task backlogs comprises the steps of:

determining whether time (T) equals a full hour;

determining whether time dependent modulation has been selected;

determining whether any of the subyards are congested; and incrementing time (T) by 15 minutes.

9. A method in accordance with claim 8 wherein said step of determining whether time (T) equals a full hour comprises the steps of:

determining a new labor mix;

incrementing time (T) by fifteen minutes; and activating the new labor mix.

10. A method in accordance with claim 8 wherein said step of determining whether time dependent modulation (TDM) has been selected comprises the step of modifying all task rates.

11. A method in accordance with claim 8 wherein said step of determining whether any of the subyards are congested comprises the step of modifying task rates of tasks performed by an engine crew.

12. A method in accordance with claim 7 wherein said step of determining whether time (T) equals simulation ending time ($T_f$) comprises the steps of:

verifying that time (T) does not equal simulation ending time ($T_f$); and repeating execution of the subroutine.

13. A method in accordance with claim 7 wherein said step of determining whether time (T) equals simulation ending time ($T_f$) comprises the steps of:

verifying that time (T) does equal simulation ending time ($T_f$);

discontinuing execution of the subroutine; and calculating a train schedule based on the re-computed task flow rates.

14. A system for managing railcar movement in a railyard based on the flow of railyard tasks, said system comprising a computer comprising a processor, a memory device, and a database, the railyard including at least one of a surge yard, a receiving yard, a receiving inspected (RI) yard, a classification yard, a departure yard and a departure inspected (DI) yard, said system configured to:

input initial parameters to said computer, simulate railyard task flow utilizing a yard performance model and the initial parameters; and determine if a train schedule can be met based on the simulated yard task flow.

15. A system in accordance with claim 14 wherein to input the initial parameters to said computer, said system further configured to:

input a simulation ending time ($T_f$);

input at least one train schedule parameter;

input a time dependent modulation (TDM) parameter;

input at least one initial task backlog parameter;

input at least one yard topology parameter; and input at least one initial labor assignment parameter.

16. A system in accordance with claim 15 wherein to simulate railyard task flow utilizing the yard performance model, said system further configured to execute a railyard performance algorithm.

17. A system in accordance with claim 16 wherein to execute said railyard performance algorithm, said system further configured to:

initialize a time (T) equal to the clock time at the railyard in which the simulation is to begin;

update task backlogs based on the initial parameters;

compute task flow rates based on the updated task backlogs; and determine whether the time (T) equals the simulation ending time ($T_f$).

18. A system in accordance with claim 17 wherein to determine if a train schedule can be met, said system further configured to:

verify that the time (T) equals the simulation ending time ($T_f$); and calculate a train schedule based on the computed task flow rates.

19. A system in accordance with claim 17 wherein to simulate railyard task flow, said system further configured to:

verify that the time (T) does not equal the simulation ending time ($T_f$); and execute a railyard performance algorithm subroutine.

20. A system in accordance with claim 19 wherein to execute said subroutine, said system further configured to:

re-update the task backlogs;

re-compute the task flow rates based on the re-updated task backlogs; and determine whether the time (T) equals the simulation ending time ($T_f$).

21. A system in accordance with claim 20 wherein to re-update task backlogs, said system further configured to:

determine whether the time (T) equals a selected length of time;

determine whether time dependent modulation has been selected;

determine whether any of the subyards are congested; and increment the time (T) by a fraction of the selected length of time.

22. A system in accordance with claim 21 wherein to determine whether said time (T) equals the selected length of time, said system further configured to:

determine a new labor mix;

increment the time (T) by the fraction of the selected length of time; and activate said new labor mix.

23. A system in accordance with claim 21 wherein to determine whether time dependent modulation (TDM) has been selected, said system further configured to modify all task rates.

24. A system in accordance with claim 21 wherein to determine whether any of the subyards are congested, said system further configured to modify task rates of tasks performed by an engine crew.

25. A system in accordance with claim 20 wherein to determine whether the time (T) equals the simulation ending time ($T_f$), said system further configured to:

verify that the time (T) does not equal the simulation ending time ($T_f$); and repeat execution of said subroutine.

26. A system in accordance with claim 20 wherein to determine whether the time (T) equals the simulation ending time ($T_f$), said system further configured to:

verify that the time (T) equals the simulation ending time ($T_f$);

discontinue execution of said subroutine; and calculate a train schedule based on the re-computed task flow rates.

27. A railyard performance model for use in management of a railyard, the railyard including six subyards including a surge yard, a receiving yard, a receiving inspected (RI) yard, a classification yard, a departure yard and a departure inspected (DI) yard, said model configured to:

simulate railcar movement in a railyard based on the flow of railyard tasks; and determine if a train schedule can be met based on the simulation.

28. A model in accordance with claim 27, wherein to simulate railcar movement, said model further configured to:

initialize a time (T) equal to the clock time at the railyard in which the simulation is to begin;

update task backlogs based on a set of initial parameters;

compute task flow rates based on the updated task backlogs; and determine whether the time (T) equals a simulation ending time ($T_f$).

29. A model in accordance with claim 28 wherein to determine if a train schedule can be met, said model further configured to:

verify that the time (T) equals the simulation ending time ($T_f$); and calculate a train schedule based on the computed task flow rates.

30. A model in accordance with claim 28 wherein to simulate railyard task flow, said model further configured to:

verify that the time (T) does not equal the simulation ending time ($T_f$); and execute a railyard performance algorithm subroutine.

31. A model in accordance with claim 30 wherein to execute said subroutine, said model further configured to:

re-update the task backlogs;

re-compute the task flow rates based on the re-updated task backlogs; and determine whether the time (T) equals the simulation ending time ($T_f$).

32. A model in accordance with claim 31 wherein to re-update task backlogs, said model further configured to:

determine whether the time (T) equals a selected length of time;

determine whether time dependent modulation has been selected;

determine whether any of the subyards are congested; and increment the time (T) by a fraction of the selected length of time.

33. A model in accordance with claim 32 wherein to determine whether the time (T) equals the selected length of time, said model further configured to:

determine a new labor mix;

increment the time (T) by the fraction of the selected length of time; and activate the new labor mix.

34. A model in accordance with claim 32 wherein to determine whether time dependent modulation (TDM) has been selected, said model further configured to modify all task rates.

35. A model in accordance with claim 32 wherein to determine whether any of the subyards are congested, said model further configured to modify task rates of tasks performed by an engine crew.

36. A model in accordance with claim 31 wherein to determine whether the time (T) equals the simulation ending time ($T_f$), said model further configured to:

verify that the time (T) does not equal the simulation ending time ($T_f$); and repeat execution of the subroutine.

37. A model in accordance with claim 31 wherein to determine whether the time (T) equals the simulation ending time ($T_f$), said model further configured to:

verify that the time (T) equals the simulation ending time ($T_f$);

discontinue execution of the subroutine; and calculate a train schedule based on the re-computed task flow rates.

* * * * *